US012803770B2

(12) United States Patent
Ren et al.

(10) Patent No.: US 12,803,770 B2
(45) Date of Patent: Nov. 17, 2026

(54) METHOD AND APPARATUS FOR TRANSMITTING AND RECEIVING TIME DIVISION DUPLEX CONFIGURATION INDICATION INFORMATION AND TERMINAL

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 456 days.

(21) Appl. No.: 17/916,933

(22) PCT Filed: Mar. 4, 2021

(86) PCT No.: PCT/CN2021/079042

§ 371 (c)(1),
(2) Date: Oct. 4, 2022

(87) PCT Pub. No.: WO2021/203879

PCT Pub. Date: Oct. 14, 2021

(65) Prior Publication Data

US 2023/0155805 A1 May 18, 2023

(30) Foreign Application Priority Data

Apr. 8, 2020 (CN) ......................... 202010267839.7

(51) Int. Cl.
*H04L 5/14* (2006.01)

(52) U.S. Cl.
CPC ................................. *H04L 5/1469* (2013.01)

(58) Field of Classification Search
CPC .................................................... H04L 5/1469
See application file for complete search history.

(56) References Cited

U.S. PATENT DOCUMENTS

2015/0296391 A1 10/2015 Kotkar et al.
2019/0090210 A1 3/2019 Islam et al.
(Continued)

FOREIGN PATENT DOCUMENTS

CN 110536449 A 12/2019
CN 110809322 A 2/2020
(Continued)

OTHER PUBLICATIONS

The Extended European Search Report for the corresponding European Patent Application No. 21784359.8 issued by the European Patent Office on Sep. 1, 2023.
"Discussion on synchronization mechanism for NR V2X," 3GPP TSG RAN WG1 Meeting #99, R1-1912578, Reno, USA, Nov. 18-22, 2019, Source: Spreadtrum Communications, Agenda Item:7. 2.4.3, all pages.
(Continued)

*Primary Examiner* — Huy D Vu
*Assistant Examiner* — Latha Chakravarthy
(74) *Attorney, Agent, or Firm* — Ladas & Parry, LLP

(57) ABSTRACT

This disclosure provides a method and apparatus for transmitting and receiving time division duplex configuration indication information and a terminal. The method for transmitting time division duplex configuration indication information includes: transmitting a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

16 Claims, 4 Drawing Sheets

(56) References Cited

U.S. PATENT DOCUMENTS

| | | | | |
|---|---|---|---|---|
| 2019/0342910 | A1 | 11/2019 | Cao | |
| 2020/0045697 | A1 | 2/2020 | Choi et al. | |
| 2022/0046598 | A1 | 2/2022 | Zhao et al. | |
| 2022/0086836 | A1* | 3/2022 | Ko | H04L 5/14 |
| 2022/0123915 | A1* | 4/2022 | Yoshioka | H04L 5/14 |
| 2023/0345488 | A1* | 10/2023 | Wu | H04W 72/20 |
| 2024/0172196 | A1* | 5/2024 | Hwang | H04L 5/14 |

FOREIGN PATENT DOCUMENTS

| | | | |
|---|---|---|---|
| CN | 111356234 | A | 6/2020 |
| CN | 111356237 | A | 6/2020 |
| EP | 3962212 | A1 | 3/2022 |
| TW | 201922002 | A | 6/2019 |

OTHER PUBLICATIONS

"Remaining issues of synchronization," 3GPP TSG RAN WG1 #100-e, R1-2000399, e-Meeting, Feb. 24-Mar. 6, 2020, Source: ZTE, Sanechips, Agenda Item: 7.2.4.3, all pages.

International Search Report for PCT Application PCT/CN2021/079042 issued on May 25, 2021, and its English Translation provided by WIPO.

Written Opinion for PCT Application PCT/CN2021/079042 issued on May 24, 2021, and its English Translation provided by WIPO.

Internationally Preliminary Report on Patentability for PCT/CN2021/079042 issued on Oct. 6, 2022, and English translation provided by WIPO.

First Office Action for Taiwanese Patent Application No. 110109470 issued on Oct. 18, 2021 and its English translation provided by foreign associate.

* cited by examiner

METHOD AND APPARATUS FOR TRANSMITTING AND RECEIVING TIME DIVISION DUPLEX CONFIGURATION INDICATION INFORMATION AND TERMINAL

CROSS-REFERENCE TO RELATED APPLICATIONS

This application is a U.S. national phase application of a PCT Application No. PCT/CN2021/079042 filed on Mar. 4, 2021, which claims priority to Chinese Patent Application No. 202010267839.7 filed in China on Apr. 8, 2020, the disclosures of which is are incorporated by reference herein in their entireties.

TECHNICAL FIELD

The present disclosure relates to the field of communications technology, in particular to a method and apparatus for transmitting and receiving time division duplex configuration indication information and a terminal.

BACKGROUND

In a vehicle-to-everything (V2X) system, in order to prevent a V2X user equipment (UE, or terminal) from interfering a Uu UE, where V2X communication referring to communication between UEs and Uu communication referring to communication between a base station and a UE, the V2X UE only transmits or receives sidelink data on an uplink carrier or uplink slot, that is, all sidelink communication only occur on the uplink carrier or uplink slot.

FIG. 1 shows the slot format information notification process for an in-coverage terminal and an out-of-coverage terminal. In the V2X system, UEs performing sidelink communication include UEs located within the coverage of the base station and UEs located outside the coverage of the base station. A UE within the coverage of the base station may receive the slot format information transmitted by the base station, so as to obtain positions of uplink slots. However, the out-of-coverage UE is unable to obtain the positions of the uplink slots. How to transmit the Uu interface slot format information to the out-of-coverage UE becomes an important problem to be solved by new radio (NR) V2X.

SUMMARY

The present disclosure provides a method and apparatus for transmitting and receiving time division duplex configuration indication information and a terminal, to notify TDD configuration indication information to an out-of-coverage terminal, so as to prevent the out-of-coverage terminal from causing severe interference to downlink data of Uu interface terminals.

Regarding the above technical problem, embodiments of the present disclosure provide the following solutions.

A method for transmitting time division duplex configuration indication information performed by a terminal is provided, including: transmitting a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

Optionally, the TDD configuration pattern quantity indication information is denoted by 1 bit.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, in case that one TDD configuration pattern is configured, one code point of the periodicity indication information indicates one periodicity of the TDD configuration pattern; in case that two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates a quantity of uplink slots within one period of a TDD configuration pattern, and the uplink slot quantity indication information is denoted by N bits, where N≥1.

Optionally, in case that one TDD configuration pattern is configured, one code point of the uplink slot quantity indication information indicates one quantity of uplink slots of the TDD configuration pattern; in case that two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the TDD configuration pattern refers to a slot combination configuration pattern having in one period one or more kinds of slots selected from a group including a downlink slot, a flexible slot, a mixed slot and an uplink slot.

Optionally, the downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the first SSB is a sidelink synchronization signal and PBCH block (S-SSB), and the PBCH is a physical sidelink broadcast channel (PSBCH).

A method for receiving time division duplex configuration indication information performed by a terminal is provided, including: receiving a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

Optionally, the TDD configuration pattern quantity indication information is denoted by 1 bit.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where $M \geq 1$.

Optionally, in case that one TDD configuration pattern is configured, one code point of the periodicity indication information indicates one periodicity of the TDD configuration pattern; in case that two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates a quantity of uplink slots within one period of a TDD configuration pattern, and the uplink slot quantity indication information is denoted by N bits, where $N \geq 1$.

Optionally, in case that one TDD configuration pattern is configured, one code point of the uplink slot quantity indication information indicates one quantity of uplink slots of the TDD configuration pattern; in case that two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and $N = N1 + N2$.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the TDD configuration pattern refers to a slot combination configuration pattern having in one period one or more kinds of slots selected from a group including a downlink slot, a flexible slot, a mixed slot and an uplink slot.

Optionally, the downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the first SSB is a sidelink synchronization signal and PBCH block (S-SSB), and the PBCH is a physical sidelink broadcast channel (PSBCH).

An apparatus for transmitting time division duplex configuration indication information applied to a terminal is further provided, including: a transceiver module, configured to transmit a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where $M \geq 1$.

Optionally, the uplink slot quantity indication information indicates a quantity of uplink slots within one period of a TDD configuration pattern, and the uplink slot quantity indication information is denoted by N bits, where $N \geq 1$.

A terminal is further provided, including a transceiver, a processor, a memory storing therein a program executable by the processor. The processor is configured to execute the program to implement: transmitting a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, the uplink slot quantity indication information indicates a quantity of uplink slots within one period of a TDD configuration pattern, and the uplink slot quantity indication information is denoted by N bits, where N≥1.

An apparatus for receiving time division duplex configuration indication information applied to a terminal is further provided, including: a transceiver module, configured to receive a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, the uplink slot quantity indication information indicates a quantity of uplink slots within one period of a TDD configuration pattern, and the uplink slot quantity indication information is denoted by N bits, where N≥1.

A terminal is further provided, including a transceiver, a processor, a memory storing therein a program executable by the processor. The processor is configured to execute the program to implement: receiving a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, the uplink slot quantity indication information indicates a quantity of uplink slots within one period of a TDD configuration pattern, and the uplink slot quantity indication information is denoted by N bits, where N≥1.

A processor-readable storage medium storing thereon a processor executable instruction is further provided, the processor executable instruction is configured to be executed by a processor, to implement the above-mentioned methods.

The embodiments of the present disclosure have the following beneficial effect. The first synchronization signal block (SSB) is transmitted, the first SSB includes the physical broadcast channel (PBCH), the PBCH carries the time division duplex (TDD) configuration indication information, and the TDD configuration indication information includes: the TDD configuration pattern quantity indication information, the periodicity indication information and the uplink slot quantity indication information. As a result, it is supported to transmit TDD configuration indication information of two TDD configuration patterns, so as not only to indicate at most two TDD configuration patterns and relevant periodicities and uplink slot quantity information, but also to avoid large signaling overhead, thereby improving the usage efficiency of PSBCH payload, and increasing information amount that PSBCH is capable of carrying when payload capacity is limited. In addition, it is able to notify the TDD configuration indication information to an out-of-coverage terminal, thereby preventing the out-of-coverage terminal from causing severe interference to downlink data of the Uu interface terminal.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Figure 1:
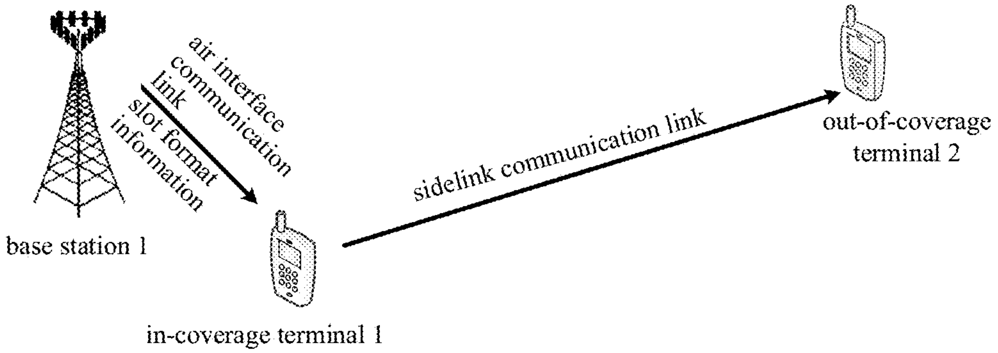
FIG. 1 is a schematic view showing a synchronization between a base station and a terminal and a synchronization between the terminal and another terminal.
Figure 2:
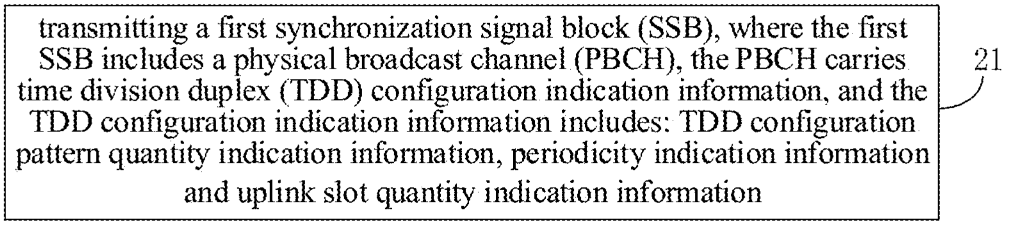
FIG. 2 is a flow chart of a method for transmitting time division duplex configuration indication information according to an embodiment of the present disclosure.

As shown in FIG. 2, the present disclosure provides in an embodiment a method for transmitting time division duplex configuration indication information, the method is performed by a terminal and includes: a step 21, transmitting a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information. The first SSB may be a sidelink synchronization signal and PBCH block (S-SSB), and the PBCH may be a physical sidelink broadcast channel (PSBCH). The TDD configuration pattern refers to a slot combination configuration pattern having in one period one or more kinds of slots selected from a group including a downlink slot, a flexible slot, a mixed slot and an uplink slot. The downlink slot is a slot where each symbol is a downlink symbol, the uplink slot is a slot where each symbol is an uplink symbol, the flexible slot is a slot where each symbol is a flexible symbol, the mixed slot is a slot including two or more kinds of symbols selected among the downlink symbol, the uplink symbol and the flexible symbol, and the flexible symbol is a symbol that is not currently configured for uplink or downlink transmission.

The TDD configuration pattern quantity indication information may indicate at most two TDD configuration patterns.

Optionally, the TDD configuration pattern quantity indication information indicates that one TDD configuration pattern is configured for a system, or that two TDD configuration patterns are configured for the system.

Figure 3:
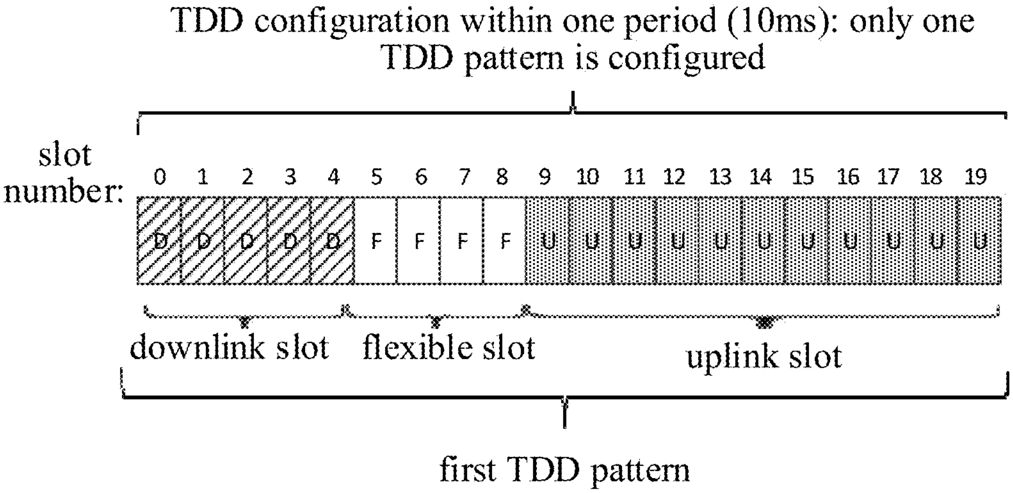
FIG. 3 is a schematic view showing a case where one TDD configuration pattern (a first TDD configuration pattern) is configured (SCS=30 KHz)

Optionally, the TDD configuration pattern quantity indication information is denoted by 1 bit. As shown in FIG. 3, when the 1-bit TDD configuration pattern quantity indication information is set to 0, it means that one TDD configuration pattern is configured for the system.

Figure 4:
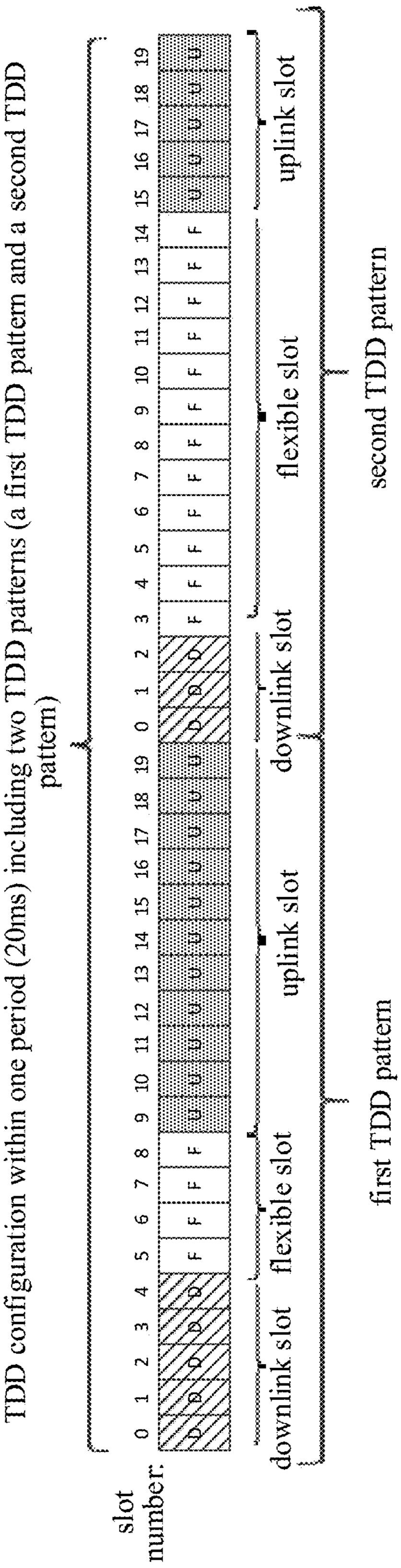
FIG. 4 is a schematic view showing a case where two TDD configuration patterns (a first TDD configuration pattern and a second TDD configuration pattern) are configured (SCS=30 KHz) according to an embodiment of the present disclosure.

As shown in FIG. 4, when the 1-bit TDD configuration pattern quantity indication information is set to 1, it means that two TDD configuration patterns cascaded in a continuous manner in the time domain are configured for the system. In other words, the system transmits data in a subframe k in accordance with the first TDD configuration pattern, and then transmits data in a subframe k+1 next to the subframe k in accordance with the second TDD configuration pattern.

FIG. 3 and FIG. 4 are schematic views of TDD configuration pattern showing a case where one TDD configuration pattern is configured and a case where two TDD configuration patterns are configured (subcarrier spacing (SCS) is equal to 30 KHz) respectively, where one small rectangle represents one slot, D represents a downlink slot, F represents a flexible slot, and U represents an uplink slot. The number in each small rectangle indicates a slot number of a current slot in the TDD configuration pattern.

In the embodiment of the present disclosure, the TDD configuration pattern quantity is indicated in the above-referenced manner, the terminal may indicate whether one TDD configuration pattern or two TDD configuration patterns are configured for a current Uu interface, thereby allowing for flexible configuration and accurate indication.

In an optional embodiment of the present disclosure, the periodicity indication information indicates a periodicity of a TDD configuration pattern; when the periodicity indication information is denoted by M bits, the periodicity indication information is used for indicating $2^M$ periodicities or combination states of periodicities, where $M \geq 1$.

Here, if one TDD configuration pattern is configured, one code point of the periodicity indication information indicates one periodicity of the TDD configuration pattern. In the embodiments of the present disclosure, the code point refers to a coding state of a field that is used for representing certain indication information.

If two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

In the embodiment, the periodicity indication information indicates the periodicity of the TDD configuration pattern. The periodicity indication information is denoted by at least 1 bit. Specifically, the periodicity indication information is denoted by 4 bits; in this way, the periodicity indication information may indicate up to 16 periodicities or combination states of periodicities.

For different SCSs, candidate periodicities are different. In order to simplify the design, the periodicity indication information indicates a complete set of all possible periodicities.

If one TDD configuration pattern is configured, one code point of the periodicity indication information indicates one periodicity of the TDD configuration pattern. As shown in Table 1, when one TDD configuration pattern is configured, there are at most 10 possible periodicities, then only 10 code points are required, and the other 6 code points are reserved code points. For example, when the code point is 9, it means that the periodicity of the first TDD configuration pattern is 10 ms, which is the case shown in FIG. 3.

TABLE 1

List of periodicities when one TDD configuration pattern is configured

| Code point of the periodicity indication information | Periodicity P of the first TDD configuration pattern (millisecond (ms)) |
|---|---|
| 0 | 0.5 |
| 1 | 0.625 |
| 2 | 1 |
| 3 | 1.25 |
| 4 | 2 |
| 5 | 2.5 |
| 6 | 3 |
| 7 | 4 |
| 8 | 5 |
| 9 | 10 |
| 10-15 | Reserved |

If two TDD configuration patterns (i.e., the first TDD configuration pattern and the second TDD configuration pattern) are configured, one code point of the periodicity indication information indicates one combination state of one periodicity of the first TDD configuration pattern and one periodicity of the second TDD configuration pattern.

As shown in Table 2, when two TDD configuration patterns are configured, there are at most 16 possible periodicities, then only 16 code points are required. For example, when the code point is 15, it indicates that both the periodicities of the first TDD configuration pattern and the second TDD configuration pattern are 10 ms, which is the case shown in FIG. 4.

TABLE 2

List of periodicities when two TDD configuration patterns are configured

| Code point of the periodicity indication information | Total periodicity P + P2 of TDD configuration patterns (ms) | Periodicity P of the first TDD configuration pattern (ms) | Periodicity P2 of the second TDD configuration pattern (ms) |
|---|---|---|---|
| 0 | 1 | 0.5 | 0.5 |
| 1 | 1.25 | 0.625 | 0.625 |
| 2 | 2 | 1 | 1 |
| 3 | 2.5 | 0.5 | 2 |
| 4 | 2.5 | 1.25 | 1.25 |
| 5 | 2.5 | 2 | 0.5 |
| 6 | 4 | 1 | 3 |
| 7 | 4 | 2 | 2 |
| 8 | 4 | 3 | 1 |
| 9 | 5 | 1 | 4 |
| 10 | 5 | 2 | 3 |
| 11 | 5 | 2.5 | 2.5 |
| 12 | 5 | 3 | 2 |
| 13 | 5 | 4 | 1 |
| 14 | 10 | 5 | 5 |
| 15 | 20 | 10 | 10 |

In the embodiment of the present disclosure, the periodicity is indicated in the above-referenced manner, the terminal may indicate different periodicity lists in different cases by using the same periodicity indication information, i.e., when one TDD configuration pattern is configured, the terminal indicates 10 possible periodicities, and when two TDD configuration patterns are configured, the terminal indicates 16 possible periodicities, thereby enabling flexible and accurate indication.

In an optional embodiment of the present disclosure, the uplink slot quantity indication information indicates a quantity of uplink slots within one period of the TDD configuration pattern(s), and the uplink slot quantity indication information is denoted by at least 1 bit. The uplink slot quantity indication information is denoted by N bits, where N≥1.

Here, if one TDD configuration pattern is configured, one code point of the uplink slot quantity indication information indicates one quantity of uplink slots of the TDD configuration pattern.

If two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

When code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

The uplink slot quantity information indicated by all code points corresponding to the N1 is a set of inconsecutive natural numbers; the uplink slot quantity information indicated by all code points corresponding to the N2 is a set of inconsecutive natural numbers.

Here, when the code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

In the embodiment, the uplink slot quantity indication information indicates the quantity of uplink slots of the TDD configuration pattern within one period. The uplink slot quantity indication information is denoted by at least 1 bit.

If one TDD configuration pattern is configured, one code point of the uplink slot quantity indication information indicates one quantity of uplink slots of the TDD configuration pattern.

If two TDD configuration patterns (i.e., the first TDD configuration pattern and the second TDD configuration pattern) are configured, the uplink slot quantity indication information indicates one quantity of uplink slots of the first TDD configuration pattern and one quantity of uplink slots of the second TDD configuration pattern. N denotes the quantity of bits occupied by the uplink slot quantity indication information, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, then N=N1+N2, where N1 may be not equal to N2.

Specifically, the uplink slot quantity indication information is denoted by 10 bits, when one TDD configuration pattern (i.e., the first TDD configuration pattern) is configured, the uplink slot quantity indication information may indicate the uplink slot quantity information of the first TDD configuration pattern. When two TDD configuration patterns (i.e., the first TDD configuration pattern and the second TDD configuration pattern) are configured, 5 bits of the uplink slot quantity indication information are used for indicating the uplink slot quantity information of the first TDD configuration pattern, and 5 bits of the uplink slot quantity indication information are used for indicating the uplink slot quantity information of the second TDD configuration pattern.

If two TDD configuration patterns (i.e., the first TDD configuration pattern and the second TDD configuration pattern) are configured, and the code points corresponding to N1 and/or N2 cannot represent all possible states of the uplink slot quantity information, then the code points corresponding to the N1 and/or N2 indicate a subset of a set of all possible states of the uplink slot quantity information of the TDD configuration patterns.

To be specific, the uplink slot quantity information of the first TDD configuration pattern and the uplink slot quantity information of the second TDD configuration pattern are denoted by N1 and/or N2 in a discontinued manner, i.e., the uplink slot quantities denoted by the code points corresponding to N1 and/or N2 are inconsecutive natural numbers.

If two TDD configuration patterns (i.e., the first TDD configuration pattern and the second TDD configuration pattern) are configured, when N1 and/or N2 cannot represent all possible states of the uplink slot quantity information, N1 and/or N2 includes one code point indicating a state where all slots in one subframe are uplink slots.

For different subcarrier spacing (SCS) configurations, the quantities of slots included in a maximum periodicity of 10 ms are different. Since each slot may be an uplink slot, different quantities of bits are required to represent the uplink slot quantity information. The quantities of bits required for the uplink slot quantity information are shown in Table 3 below. For example, when the SCS is configured as 120 KHz, and the periodicity is configured as 10 ms, the quantity of slots in one period is 80, then the quantity of uplink slots may be 0~80, which is a total of 81 possibilities. 7 bits ($2^7$=128) are required to represent any one of the 81 possibilities.

TABLE 3

List of the quantities of bits required for the uplink slot quantity information

| SCS | periodicity | the quantity of slots corresponding to the periodicity | the quantity of bits required for the uplink slot quantity information |
|---|---|---|---|
| 15 KHz | 10 ms | 10 slots | 4 bits |
| 30 KHz | 10 ms | 20 slots | 5 bits |
| 60 KHz | 10 ms | 40 slots | 6 bits |
| 120 KHz | 10 ms | 80 slots | 7 bits |

In a normal design, the uplink slot quantity indication information should be able to cover all cases, so it is necessary to design for a case that requires the largest quantity of bits. The case that requires the largest quantity of bits is that two TDD configuration patterns are configured when SCS=120 KHz. In this case, 7 bits are required to indicate each TDD configuration pattern. Considering that two TDD configuration patterns may be configured, 7+7=14 bits are required to indicate the uplink slot quantity information of the two TDD configuration patterns.

The above scheme can cover all possible cases of the uplink slot quantities, but the signaling overhead of the PSBCH payload is relatively high. Therefore, in order to reduce the overhead, another scheme is not to cover all possible cases of uplink slot quantities; instead, if two TDD configuration patterns (i.e., the first TDD configuration pattern and the second TDD configuration pattern) are configured, when the code points corresponding to N1 and/or N2 cannot represent all possible states of the uplink slot quantity information, the code points corresponding to the N1 and/or N2 indicate a subset of a set of all possible states of the uplink slot quantity information of the TDD configuration patterns. In this way, it is able to avoid the relatively high signaling overhead.

For example, N1=N2=5, 5 bits are used for each of the first TDD configuration pattern and the second TDD configuration pattern to indicate 32 possible states of the uplink slot quantity information, and both the uplink slot quantity information of the first TDD configuration pattern and the uplink slot quantity information of the second TDD configuration pattern are indicated in the discontinued manner, i.e., the uplink slot quantity information indicated by all code points corresponding to the N1 is a set of inconsecutive natural numbers, and the uplink slot quantity information indicated by all code points corresponding to the N2 is a set of inconsecutive natural numbers, as shown in Table 4. As can be seen in Table 4, a code point of N1 or N2 being 0 indicates that the quantity of uplink slots is 0, and a code point of N1 or N2 being 1 indicates that the quantity of uplink slots is 2, so the indicated quantities of uplink slots are inconsecutive. The same is true for other code points. An advantage resulting from such a design is: fewer N1 or N2 bits are required to denote the uplink slot quantity information, thereby reducing the information overhead.

When only one TDD configuration pattern is configured, 10 bits are sufficient to indicate all cases of uplink slot quantities, and can guarantee that the indicated quantities of uplink slots are consecutive. In addition, when two TDD configuration patterns are configured and SCS is equal to 15 KHz or 30 KHz, it is also able to use 10 bits to indicate all cases of uplink slot quantities, and it can be guaranteed that the indicated quantities of uplink slots are continuous.

In addition, it should be appreciated that, although the indicated quantities of uplink slots are the same in Table 4 when the code points of N1 and N2 are the same, the indicated quantities of uplink slots may be different in an actual design.

If two TDD configuration patterns (i.e., the first TDD configuration pattern and the second TDD configuration pattern) are configured, when the code points corresponding to N1 and/or N2 cannot indicate all possible states of the uplink slot quantity information, the code points corresponding to N1 and/or N2 include one code point indicating a state where all slots in one subframe are uplink slots, that is, a code point of 31 indicating a state where the quantity of uplink slots is equal to 80 in Table 4.

TABLE 4 the uplink slot quantity information indicated in the discontinued manner (SCS = 120 KHz, and two TDD configuration patterns are configured)

| Code point of the uplink slot quantity indication information (N1 or N2) | the quantity of uplink slots in the first TDD configuration pattern (denoted by N1) | the quantity of uplink slots in the second TDD configuration pattern (denoted by N2) |
|---|---|---|
| 0 | 0 | 0 |
| 1 | 2 | 2 |
| 2 | 4 | 4 |
| 3 | 6 | 6 |
| 4 | 8 | 8 |
| 5 | 10 | 10 |
| 6 | 12 | 12 |
| 7 | 14 | 14 |
| 8 | 16 | 16 |
| 9 | 18 | 18 |
| 10 | 20 | 20 |
| 11 | 22 | 22 |
| 12 | 24 | 24 |
| 13 | 26 | 26 |
| 14 | 29 | 29 |
| 15 | 32 | 32 |
| 16 | 35 | 35 |
| 17 | 38 | 38 |
| 18 | 41 | 41 |
| 19 | 44 | 44 |
| 20 | 47 | 47 |
| 21 | 50 | 50 |
| 22 | 53 | 53 |
| 23 | 56 | 56 |
| 24 | 59 | 59 |
| 25 | 62 | 62 |
| 26 | 65 | 65 |
| 27 | 68 | 68 |
| 28 | 71 | 71 |
| 29 | 74 | 74 |
| 30 | 77 | 77 |
| 31 | 80 | 80 |

In the embodiment of the present disclosure, the uplink slot quantity information is indicated in the discontinued manner, so that the terminal may indicate different uplink slot quantity information in different cases with a small signaling overhead, i.e., when one TDD configuration pattern is configured, at most 81 possible quantities of uplink slots are indicated, and when two TDD configuration patterns are configured, 32 possible quantities of uplink slots are indicated for each TDD configuration pattern, thereby enabling flexible and accurate indication.

In one implementation, the uplink slot quantity indication information occupies 8 bits.

Based on the above scheme, when 1 bit in the PSBCH payload is used for indicating the TDD configuration pattern quantity indication information, 4 bits in the PSBCH payload are used for indicating the periodicity indication information, and 8 bits in the PSBCH payload are used for indicating the uplink slot quantity indication information (4 bits of the 8 bits denote the uplink slot quantity information of the first TDD configuration pattern, and the other 4 bits of the 8 bits denote the uplink slot quantity information of the second TDD configuration pattern), three candidate schemes for bits occupied by the PSBCH payload are as shown in Table 5 to Table 7.

Table 5 shows a case where the PSBCH payload includes 3 more significant bits of an S-SSB index and synchronization resource indication information (3 less significant bits of the S-SSB index are carried by PSBCH demodulation reference signal (DMRS)).

Table 6 shows a case where the PSBCH payload includes 4 more significant bits of a slot number (3 less significant bits of the slot number are carried by PSBCH DMRS).

Table 7 shows a case where the PSBCH payload includes all 7 bits of the slot number. NOTE: in addition to the content in the Table below, the PSBCH payload may include other information.

TABLE 5

Bits occupied by the PSBCH payload (TDD configuration information occupies 13 bits & S-SSB index is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 13 | 13 bits = 1 bit (TDD configuration pattern quantity indication information) + 4 bits (periodicity indication information) + 8 bits (uplink slot quantity indication information: 8 = 4 + 4) |
| Sync resource indicator | 2 | 1 bit indicating that the first S-SSB belongs to a first synchronization resource set, or a second synchronization resource set |
| S-SSB index | 3 | indicating 3 more significant bits among 6 bits of the S-SSB index in the case of frequency range 2 (FR2) |
| InCoverage Indicator | 1 | indicating whether the terminal is within the coverage of a base station |
| Reserved | 3 | reserved bits |
| CRC | 24 | |
| Total | 56 | |

TABLE 6

Bits occupied by the PSBCH payload (TDD configuration information occupies 13 bits & a part of the slot number is included)

| Content of the PSBCH payload | Required quantity of bits | Note |
|---|---|---|
| DirectFrameNumber | 10 | a range of the indicated direct frame number: [0, 1023] |

TABLE 6-continued

Bits occupied by the PSBCH payload (TDD configuration information occupies 13 bits & a part of the slot number is included)

| Content of the PSBCH payload | Required quantity of bits | Note |
|---|---|---|
| TDD-UL-DL Configuration | 13 | 13 bits = 1 bit (TDD configuration pattern quantity indication information) + 4 bits (periodicity indication information) + 8 bits (uplink slot quantity indication information: 8 = 4 + 4) |
| Slot number | 4 | indicating 4 more significant bits among 7 bits of the slot number |
| InCoverage Indicator | 1 | indicating whether the terminal is within the coverage of a base station |
| Reserved | 4 | reserved bits |
| CRC | 24 | |
| Total | 56 | |

TABLE 7

Bits occupied by the PSBCH payload (TDD configuration information occupies 13 bits & the entire slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 13 | 13 bits = 1 bit (TDD configuration pattern quantity indication information) + 4 bits (periodicity indication information) + 8 bits (uplink slot quantity indication information: 8 = 4 + 4) |
| Slot number | 7 | indicating 3 more significant bits among 6 bits of the S-SSB index in the case of FR2 |
| InCoverage Indicator | 1 | indicating whether the terminal is within the coverage of a base station |
| Reserved | 1 | reserved bit |
| CRC | 24 | |
| Total | 56 | |

Based on the above PSBCH payload scheme, the PSBCH payload of 56 bits may accommodate all necessary information, and the TDD configuration indication information may indicate the case of two TDD configuration patterns, thereby incurring small overhead.

In one implementation, the uplink slot quantity indication information occupies 10 bits.

Based on the above scheme, when 1 bit in the PSBCH payload is used for indicating the TDD configuration pattern quantity indication information, 4 bits in the PSBCH payload are used for indicating the periodicity indication information, and 10 bits in the PSBCH payload are used for indicating the uplink slot quantity indication information (5 bits of the 10 bits indicate the uplink slot quantity information of the first TDD configuration pattern, and the other 5 bits of the 10 bits indicate the uplink slot quantity information of the second TDD configuration pattern), three candidate schemes for the bits occupied by the PSBCH payload are as shown in Table 8 to Table 10.

Table 8 shows a case where the PSBCH payload includes 3 more significant bits of an S-SSB index and synchronization resource indication information (3 less significant bits of the S-SSB index are carried by PSBCH DMRS).

Table 9 shows a case where the PSBCH payload includes 4 more significant bits of a slot number (3 less significant bits of the slot number are carried by PSBCH DMRS).

Table 10 shows a case where the PSBCH payload includes all 7 bits of the slot number. NOTE: in addition to the content in the Table below, the PSBCH payload may include other information.

TABLE 8

Bits occupied by the PSBCH payload (TDD configuration information occupies 15 bits & S-SSB index is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 15 | 15 bits = 1 bit (TDD configuration pattern quantity indication information) + 4 bits (periodicity indication information) + 10 bits (uplink slot quantity indication information: 10 = 5 + 5) |
| Sync resource indicator | 2 | 1 bit indicating that the first S-SSB belongs to a first synchronization resource set, or a second synchronization resource set |
| S-SSB index | 3 | indicating 3 more significant bits among 6 bits of the S-SSB index in the case of FR2 |
| InCoverage Indicator | 1 | indicating whether the terminal is within the coverage of a base station |
| Reserved | 1 | reserved bit |
| CRC | 24 | |
| Total | 56 | |

TABLE 9

Bits occupied by the PSBCH payload (TDD configuration information occupies 15 bits & a part of the slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 15 | 15 bits = 1 bit (TDD configuration pattern quantity indication information) + 4 bits (periodicity indication information) + 10 bits (uplink slot quantity indication information: 10 = 5 + 5) |
| Slot number | 4 | indicating 4 more significant bits among 7 bits of the slot number |
| InCoverage Indicator | 1 | indicating whether the terminal is within the coverage of a base station |
| Reserved | 2 | reserved bits |
| CRC | 24 | |
| Total | 56 | |

TABLE 10

Bits occupied by the PSBCH payload (TDD configuration information occupies 15 bits & the entire slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 15 | 15 bits = 1 bit (TDD configuration pattern quantity indication information) + 4 bits (periodicity indication information) + 10 bits (uplink slot quantity indication information: 10 = 5 + 5) |
| Slot number | 7 | indicating 3 more significant bits among 6 bits of the S-SSB index in the case of FR2 |
| InCoverage Indicator | 1 | indicating whether the terminal is within the coverage of a base station |
| Reserved | 1 | reserved bit |
| CRC | 24 | |
| Total | 58 | |

Based on the above PSBCH payload scheme, the PSBCH payload of 56 bits or 58 bits may accommodate all necessary information, and the TDD configuration indication information may also indicate the case of two TDD configuration patterns, thereby incurring small overhead. In addition, the quantity of uplink slots in each TDD configuration pattern may be denoted by 5 bits, a granularity is small, and the uplink slots unavailable to the sidelink are less.

In one implementation, the uplink slot quantity indication information occupies 12 bits.

Based on the above scheme, when 1 bit in the PSBCH payload is used for indicating the TDD configuration pattern quantity indication information, 4 bits in the PSBCH payload are used for indicating the periodicity indication information, and 12 bits in the PSBCH payload are used for indicating the uplink slot quantity indication information (6 bits of the 12 bits indicate the uplink slot quantity information of the first TDD configuration pattern, and the other 6 bits of the 12 bits indicate the uplink slot quantity information of the second TDD configuration pattern), three candidate schemes for the bits occupied by the PSBCH payload are as shown in Table 11 to Table 13.

Table 11 shows a case where the PSBCH payload includes 3 more significant bits of an S-SSB index and synchronization resource indication information (3 less significant bits of the S-SSB index are carried by PSBCH DMRS).

Table 12 shows a case where the PSBCH payload includes 4 more significant bits of a slot number (3 less significant bits of the slot number are carried by PSBCH DMRS).

Table 13 shows a case where the PSBCH payload includes all 7 bits of the slot number.

NOTE: in addition to the content in the Table below, the PSBCH payload may include other information.

TABLE 11

Bits occupied by the PSBCH payload (TDD configuration information occupies 17 bits & S-SSB index is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 17 | 17 bits = 1 bit (TDD configuration pattern quantity indication information) + 4 bits (periodicity indication information) + 12 bits (uplink slot quantity indication information: 12 = 6 + 6) |
| Sync resource indicator | 2 | 1 bit indicating that the first S-SSB belongs to a first synchronization resource set, or a second synchronization resource set |

TABLE 11-continued

Bits occupied by the PSBCH payload (TDD configuration information occupies 17 bits & S-SSB index is included)

| Content of the PSBCH payload | Required quantity of bits | Note |
|---|---|---|
| S-SSB index | 3 | indicating 3 more significant bits among 6 bits of the S-SSB index in the case of FR2 |
| InCoverage Indicator | 1 | indicating whether the terminal is within the coverage of a base station |
| Reserved | 2 | reserved bits |
| CRC | 24 | |
| Total | 59 | |

TABLE 12

Bits occupied by the PSBCH payload (TDD configuration information occupies 17 bits & a part of the slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 17 | 17 bits = 1 bit (TDD configuration pattern quantity indication information) + 4 bits (periodicity indication information) + 12 bits (uplink slot quantity indication information: 12 = 6 + 6) |
| Slot number | 4 | indicating 4 more significant bits among 7 bits of the slot number |
| InCoverage Indicator | 1 | indicating whether the terminal is within the coverage of a base station |
| Reserved | 2 | reserved bits |
| CRC | 24 | |
| Total | 58 | |

TABLE 13

Bits occupied by the PSBCH payload (TDD configuration information occupies 17 bits & the entire slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 17 | 17 bits = 1 bit (TDD configuration pattern quantity indication information) + 4 bits (periodicity indication information) + 12 bits (uplink slot quantity indication information: 12 = 6 + 6) |
| Slot number | 7 | indicating 3 more significant bits among 6 bits of the S-SSB index in the case of FR2 |
| InCoverage Indicator | 1 | indicating whether the terminal is within the coverage of a base station |
| Reserved | 2 | reserved bits |
| CRC | 24 | |
| Total | 61 | |

Based on the above PSBCH payload scheme, the case of two TDD configuration patterns may be indicated, the quantity of uplink slots in each TDD configuration pattern may be denoted by 6 bits, a granularity is very small, and the uplink slots unavailable to the sidelink are scarce, thereby providing a high resource utilization.

In one implementation, the uplink slot quantity indication information occupies 14 bits.

Based on the above scheme, when 1 bit in the PSBCH payload is used for indicating the TDD configuration pattern quantity indication information, 4 bits in the PSBCH payload are used for indicating the periodicity indication information, and 14 bits in the PSBCH payload is used for indicating the uplink slot quantity indication information (7 bits of the 14 bits indicate the uplink slot quantity information of the first TDD configuration pattern, and the other 7 bits of the 14 bits indicate the uplink slot quantity information of the second TDD configuration pattern), three candidate schemes for the bits occupied by the PSBCH payload are as shown in Table 14 to Table 16.

Table 14 shows a case where the PSBCH payload includes 3 more significant bits of an S-SSB index and synchronization resource indication information (3 less significant bits of the S-SSB index are carried by PSBCH DMRS).

Table 15 shows a case where the PSBCH payload includes 4 more significant bits of a slot number (3 less significant bits of the slot number are carried by PSBCH DMRS).

Table 16 shows a case where the PSBCH payload includes all 7 bits of the slot number. NOTE: in addition to the content in the Table below, the PSBCH payload may include other information.

TABLE 14

Bits occupied by the PSBCH payload (TDD configuration information occupies 19 bits & S-SSB index is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 19 | 19 bits = 1 bit (TDD configuration pattern quantity indication information) + 4 bits (periodicity indication information) + 14 bits (uplink slot quantity indication information: 14 = 7 + 7) |
| Sync resource indicator | 2 | 1 bit indicating that the first S-SSB belongs to a first synchronization resource set, or a second synchronization resource set |
| S-SSB index | 3 | indicating 3 more significant bits among 6 bits of the S-SSB index in the case of FR2 |
| InCoverage Indicator | 1 | indicating whether the terminal is within the coverage of a base station |
| Reserved | 2 | reserved bits |
| CRC | 24 | |
| Total | 61 | |

TABLE 15

Bits occupied by the PSBCH payload (TDD configuration information occupies 19 bits & a part of the slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 19 | 19 bits = 1 bit (TDD configuration pattern quantity indication information) + 4 bits (periodicity indication information) + 4 bits (uplink slot quantity indication information: 14 = 7 + 7) |

TABLE 15-continued

Bits occupied by the PSBCH payload (TDD configuration information occupies 19 bits & a part of the slot number is included)

| Content of the PSBCH payload | Required quantity of bits | Note |
|---|---|---|
| Slot number | 4 | indicating 4 more significant bits among 7 bits of the slot number |
| InCoverage Indicator | 1 | indicating whether the terminal is within the coverage of a base station |
| Reserved | 2 | reserved bits |
| CRC | 24 | |
| Total | 60 | |

TABLE 16

Bits occupied by the PSBCH payload (TDD configuration information occupies 19 bits & the entire slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 19 | 19 bits = 1 bit (TDD configuration pattern quantity indication information) + 4 bits (periodicity indication information) + 4 bits (uplink slot quantity indication information: 14 = 7 + 7) |
| Slot number | 7 | indicating 3 more significant bits among 6 bits of the S-SSB index in the case of FR2 |
| InCoverage Indicator | 1 | indicating whether the terminal is within the coverage of a base station |
| Reserved | 2 | reserved bits |
| CRC | 24 | |
| Total | 63 | |

TABLE 17

Bits occupied by the PSBCH payload (TDD configuration information occupies 19 bits & the entire slot number is included)

| Content of the PSBCH payload | Required quantity of bits | Note |
|---|---|---|
| DirectFrameNumber | 10 | a range of the indicated direct frame number: [0, 1023] |
| TDD-UL-DL Configuration | 19 | 19 bits = 1 bit (TDD configuration pattern quantity indication information) + 4 bits (periodicity indication information) + 4 bits (uplink slot quantity indication information: 14 = 7 + 7) |
| Slot number | 7 | indicating 3 more significant bits among 6 bits of the S-SSB index in the case of FR2 |
| InCoverage Indicator | 1 | indicating whether the terminal is within the coverage of a base station |
| Reserved | 3 | reserved bits |
| CRC | 24 | |
| Total | 64 | |

Based on the above PSBCH payload scheme, the case of two TDD configuration patterns may be indicated, the quantity of uplink slots in each TDD configuration pattern may be denoted by 7 bits, a granularity is minimum, all the cases of the uplink slot quantities may be indicated, and all the uplink slots are available to the sidelink, thereby providing a highest resource utilization.

When the embodiments of the present disclosure are applied to a sidelink communication, it is able not only to indicate at most two TDD configuration patterns and relevant periodicities and uplink slot quantity information, but also to avoid large signaling overhead, thereby improving the usage efficiency of PSBCH payload, and increasing information that PSBCH is capable of carrying in the case of limited payload capacity. In addition, it is able to notify the TDD configuration indication information to an out-of-coverage terminal, so as to prevent the out-of-coverage terminal from causing severe interference to downlink data of the Uu interface terminal.

Figure 5:
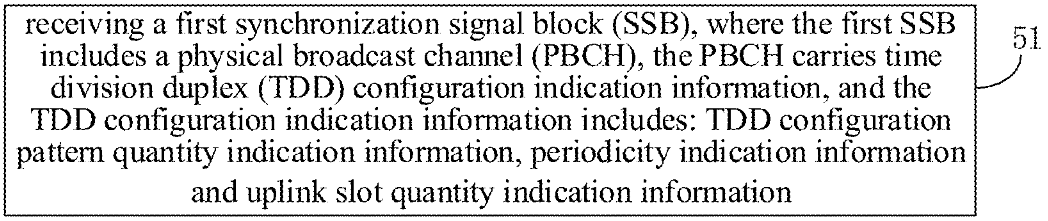
FIG. 5 is a flow chart of a method for receiving time division duplex configuration indication information according to an embodiment of the present disclosure.

As shown in FIG. 5, the present disclosure provides in an embodiment a method for receiving time division duplex configuration indication information. The method is performed by a terminal and includes: a step 51, receiving a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information. The TDD configuration pattern refers to a slot combination configuration pattern having in one period one or more kinds of slots selected from a group including a downlink slot, a flexible slot, a mixed slot and an uplink slot. The downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the TDD configuration pattern quantity indication information is denoted by 1 bit.

Optionally, the TDD configuration pattern quantity indication information may indicate at most two TDD configuration patterns.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, M=4.

Optionally, if one TDD configuration pattern is configured, one code point of the periodicity indication information indicates one periodicity of the TDD configuration pattern.

Optionally, if two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates the quantity of uplink slots within one period of a TDD configuration pattern, and the uplink slot quantity indication information is denoted by N bits, where N≥1.

Optionally, if one TDD configuration pattern is configured, one code point of the uplink slot quantity indication information indicates one quantity of uplink slots of the TDD configuration pattern.

Optionally, if two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

Optionally, N=10.

Optionally, when two TDD configuration patterns are configured, N1=5, and N2=5.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the first SSB is a sidelink synchronization signal and PBCH block (S-SSB), and the PBCH is a physical sidelink broadcast channel (PSBCH).

It should be appreciated that, the method for receiving TDD configuration indication information may be applied to a receiving side terminal and corresponds to the above-mentioned method for transmitting time division duplex configuration indication information shown in FIG. 2. The implementations of the method shown in FIG. 2 may also be applied to the method for receiving TDD configuration indication information and may achieve the same technical effects.

Figure 6:
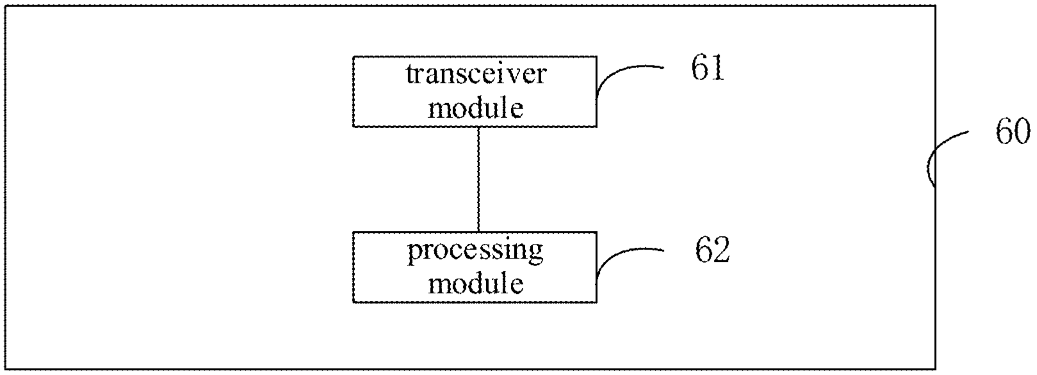
FIG. 6 is a block diagram of an apparatus for transmitting time division duplex configuration indication information according to an embodiment of the present disclosure.

As shown in FIG. 6, the present disclosure provides in an embodiment an apparatus 60 for transmitting time division duplex configuration indication information. The apparatus 60 is applied to a terminal and includes: a transceiver module 61, configured to transmit a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information. The TDD configuration pattern refers to a slot combination configuration pattern having in one period one or more kinds of slots selected from a group including a downlink slot, a flexible slot, a mixed slot and an uplink slot. The downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the TDD configuration pattern quantity indication information is denoted by 1 bit.

Optionally, the TDD configuration pattern quantity indication information may indicate at most two TDD configuration patterns.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, M=4.

Optionally, if one TDD configuration pattern is configured, one code point of the periodicity indication information indicates one periodicity of the TDD configuration pattern.

Optionally, if two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates a quantity of uplink slots within one period of a TDD configuration pattern, and the uplink slot quantity indication information is denoted by N bits, where N≥1.

Optionally, if one TDD configuration pattern is configured, one code point of the uplink slot quantity indication information indicates one quantity of uplink slots of the TDD configuration pattern.

Optionally, if two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

Optionally, N=10.

Optionally, when two TDD configuration patterns are configured, N1=5, and N2=5.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the first SSB is a sidelink synchronization signal and PBCH block (S-SSB), and the PBCH is a physical sidelink broadcast channel (PSBCH).

It should be appreciated that, the apparatus for transmitting TDD configuration indication information corresponds to the above-mentioned method for transmitting time division duplex configuration indication information shown in FIG. 2. The implementations of the method shown in FIG. 2 may also be applied to embodiments of the apparatus for transmitting TDD configuration indication information and may achieve the same technical effects. The apparatus may further include a processing module 62 for processing information transmitted by the transceiver module 61, etc. It should be noted that the apparatus for transmitting TDD configuration indication information provided in the embodiments of the present disclosure is capable of implementing all method steps of the foregoing method embodiments, and may achieve the same technical effects. To avoid repetition, the same part and beneficial effects of this apparatus embodiment as those of the method embodiments are not described in detail again.

Figure 7:
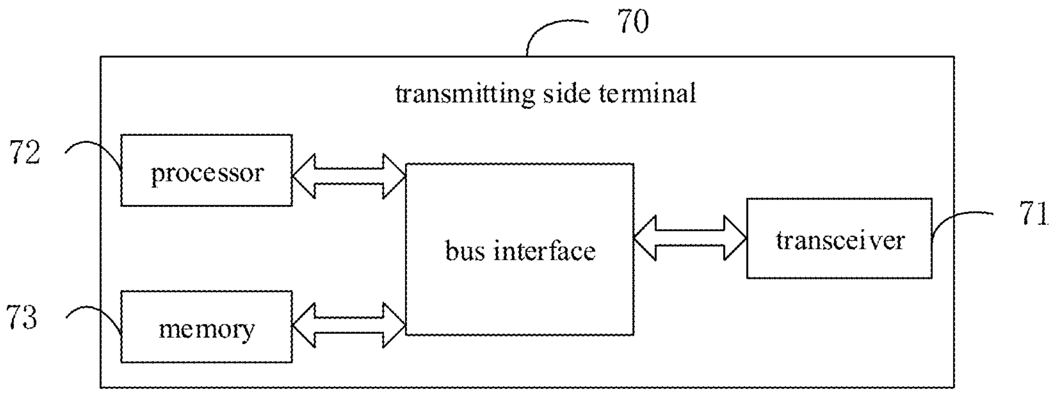
FIG. 7 is a schematic structural view showing a terminal at a transmitting side according to an embodiment of the present disclosure.

As shown in FIG. 7, the present disclosure provides in an embodiment a terminal 70, including a transceiver 71, a processor 72, and a memory 73 storing therein a program executable by the processor 72, where the processor 72 is configured to execute the program to implement: transmitting a first synchronization signal block (SSB), the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information. The TDD configuration pattern refers to a slot combination configuration pattern having in one period one or more kinds of slots selected from a group including a downlink slot, a flexible slot, a mixed slot and an uplink slot. The downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the TDD configuration pattern quantity indication information is denoted by 1 bit.

Optionally, the TDD configuration pattern quantity indication information may indicate at most two TDD configuration patterns.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, M=4.

Optionally, if one TDD configuration pattern is configured, one code point of the periodicity indication information indicates one periodicity of the TDD configuration pattern.

Optionally, if two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates the quantity of uplink slots within one period of a TDD configuration pattern, and the uplink slot quantity indication information is denoted by N bits, where N≥1.

Optionally, if one TDD configuration pattern is configured, one code point of the uplink slot quantity indication information indicates one quantity of uplink slots of the TDD configuration pattern.

Optionally, if two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

Optionally, N=10.

Optionally, when two TDD configuration patterns are configured, N1=5, and N2=5.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the first SSB is a sidelink synchronization signal and PBCH block (S-SSB), and the PBCH is a physical sidelink broadcast channel (PSBCH).

It should be appreciated that, the terminal in the embodiment corresponds to the above-mentioned method for transmitting time division duplex configuration indication information shown in FIG. 2. The implementations of the method shown in FIG. 2 may also be applied to embodiments of the terminal and may achieve the same technical effects. In the terminal, the transceiver 71 and the memory 73, as well as the transceiver 71 and the processor 72 may establish a communicative connection therebetween through a bus interface, the function of the processor 72 may also be realized by the transceiver 71, and the function of the transceiver 71 may also be realized by the processor 72. It should be noted that the terminal provided in the embodiment of the present disclosure is capable of implementing all method steps of the foregoing method embodiments, and may achieve the same technical effects. To avoid repetition, the same part and beneficial effects of this terminal embodiment as those of the method embodiments are not described in detail again.

Figure 8:
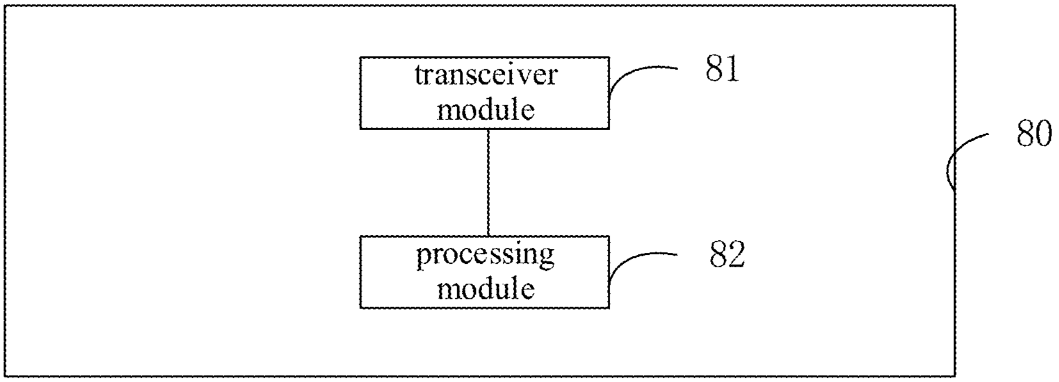
FIG. 8 is a block diagram of an apparatus for receiving time division duplex configuration indication information according to an embodiment of the present disclosure.

As shown in FIG. 8, the present disclosure provides in an embodiment an apparatus 80 for receiving time division duplex configuration indication information. The apparatus 80 is applied to a terminal, and includes: a transceiver module 81, configured to receive a first synchronization signal block (SSB), where the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information. The TDD configuration pattern refers to a slot combination configuration pattern having in one period one or more kinds of slots selected from a group including a downlink slot, a flexible slot, a mixed slot and an uplink slot. The downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the TDD configuration pattern quantity indication information is denoted by 1 bit.

Optionally, the TDD configuration pattern quantity indication information may indicate at most two TDD configuration patterns.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where $M \geq 1$.

Optionally, M=4.

Optionally, if one TDD configuration pattern is configured, one code point of the periodicity indication information indicates one periodicity of the TDD configuration pattern.

Optionally, if two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates the quantity of uplink slots within one period of a TDD configuration pattern, and the uplink slot quantity indication information is denoted by N bits, where $N \geq 1$.

Optionally, if one TDD configuration pattern is configured, one code point of the uplink slot quantity indication information indicates one quantity of uplink slots of the TDD configuration pattern.

Optionally, if two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

Optionally, N=10.

Optionally, when two TDD configuration patterns are configured, N1=5, and N2=5.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the first SSB is a sidelink synchronization signal and PBCH block (S-SSB), and the PBCH is a physical sidelink broadcast channel (PSBCH).

It should be appreciated that, the apparatus for receiving TDD configuration indication information corresponds to the above-mentioned method for receiving time division duplex configuration indication information shown in FIG. 5. The implementations of the method shown in FIG. 5 may also be applied to the apparatus for receiving TDD configuration indication information and may achieve the same technical effects. The apparatus may further include a processing module 82 for processing information transmitted by the transceiver module 81, etc. It should be noted that the apparatus for receiving TDD configuration indication information is capable of implementing all method steps of the foregoing method embodiments, and may achieve the same technical effects. To avoid repetition, the same part and beneficial effects of this apparatus embodiment as those of the method embodiments are not described in detail again.

Figure 9:
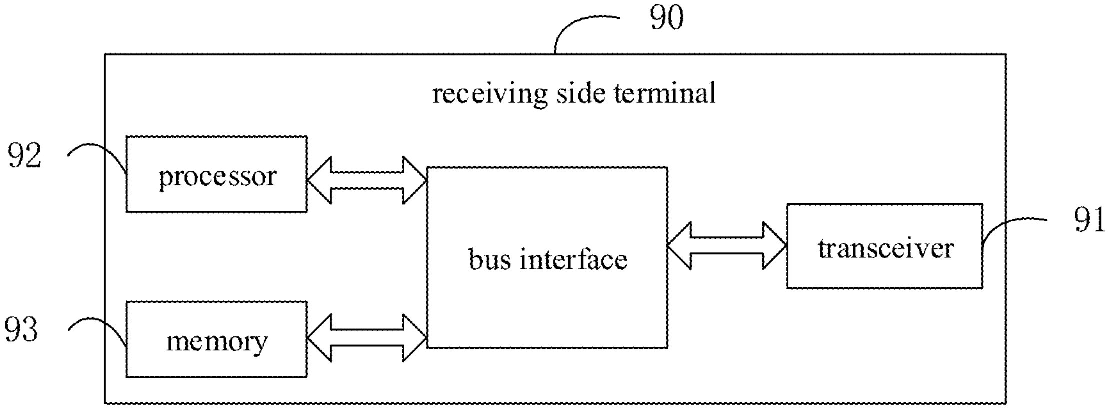
FIG. 9 is a schematic structural view showing a terminal at a receiving side according to an embodiment of the present disclosure.

As shown in FIG. 9, the present disclosure provides in an embodiment a terminal 90, including a transceiver 91, a processor 92, and a memory 93 storing therein a program executable by the processor 92, where the processor 92 is configured to execute the program to implement: receiving a first synchronization signal block (SSB), the first SSB includes a physical broadcast channel (PBCH), the PBCH carries time division duplex (TDD) configuration indication information, and the TDD configuration indication information includes: TDD configuration pattern quantity indication information, periodicity indication information and uplink slot quantity indication information. The TDD configuration pattern refers to a slot combination configuration pattern having in one period one or more kinds of slots selected from a group including a downlink slot, a flexible slot, a mixed slot and an uplink slot. The downlink slot is a slot where each symbol is a downlink symbol, the flexible slot is a slot where each symbol is a flexible symbol, the uplink slot is a slot where each symbol is an uplink symbol, the mixed slot is a slot including two or more kinds of symbols selected among the downlink symbol, the uplink symbol and the flexible symbol, and the flexible symbol is a symbol that is not currently configured for uplink or downlink transmission.

Optionally, the TDD configuration pattern quantity indication information is denoted by 1 bit.

Optionally, the TDD configuration pattern quantity indication information may indicate at most two TDD configuration patterns.

Optionally, the TDD configuration pattern quantity indication information indicates that one TDD configuration pattern is configured for a system, or that two TDD configuration patterns are configured for the system.

Optionally, the periodicity indication information indicates a periodicity of a TDD configuration pattern; when the periodicity indication information is denoted by M bits, the periodicity indication information is used for indicating $2^M$ periodicities or combination states of periodicities, where M≥1.

Optionally, M=4.

Optionally, if one TDD configuration pattern is configured, one code point of the periodicity indication information indicates one periodicity of the TDD configuration pattern.

Optionally, if two TDD configuration patterns including a first TDD configuration pattern and a second TDD configuration pattern are configured, one code point of the periodicity indication information indicates one combination state of one periodicity of the first TDD configuration pattern and one periodicity of the second TDD configuration pattern.

Optionally, the uplink slot quantity indication information indicates the quantity of uplink slots within one period of a TDD configuration pattern, and the uplink slot quantity indication information is denoted by N bits, where N≥1.

Optionally, if one TDD configuration pattern is configured, one code point of the uplink slot quantity indication information indicates one quantity of uplink slots of the TDD configuration pattern.

Optionally, if two TDD configuration patterns including a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern.

Optionally, when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2.

Optionally, N=10.

Optionally, when two TDD configuration patterns are configured, N1=5, and N2=5.

Optionally, when code points corresponding to the N1 and/or N2 are incapable of denoting all possible states of the uplink slot quantity information, the code points corresponding to the N1 and/or N2 indicate a subset of a set of all possible states of the uplink slot quantity information of the TDD configuration patterns.

Optionally, the uplink slot quantity information indicated by all code points corresponding to the N1 is a set of inconsecutive natural numbers; the uplink slot quantity information indicated by all code points corresponding to the N2 is a set of inconsecutive natural numbers.

Optionally, when code points corresponding to the N1 and/or N2 are incapable of denoting all possible states of the uplink slot quantity information, the code points corresponding to N1 and/or N2 include one code point indicating a state where all slots within one period of the TDD configuration patterns are uplink slots.

Optionally, the first SSB is a sidelink synchronization signal and PBCH block (S-SSB), and the PBCH is a physical sidelink broadcast channel (PSBCH).

It should be appreciated that, the terminal in this embodiment corresponds to the above-mentioned method for receiving time division duplex configuration indication information shown in FIG. 5. The implementations of the method shown in FIG. 5 may also be applied to the terminal and may achieve the same technical effects. In the terminal, the transceiver 91 and the memory 93, as well as the transceiver 91 and the processor 92 may establish a communicative connection therebetween through a bus interface, the function of the processor 92 may also be realized by the transceiver 91, and the function of the transceiver 91 may also be realized by the processor 92. It should be noted that the terminal provided in the embodiment of the present disclosure is capable of implementing all method steps of the foregoing method embodiments, and may achieve the same technical effects. To avoid repetition, the same part and beneficial effects of this terminal embodiment as those of the method embodiments are not described in detail again.

The present disclosure provides in an embodiment a processor-readable storage medium storing thereon a processor executable instruction, the processor executable instruction is configured to be executed by a processor, to implement the above-mentioned methods as shown in FIG. 2 or FIG. 5. The implementations of the method in FIG. 2 or FIG. 5 may also be applied to this embodiment and may achieve the same technical effects.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of this disclosure.

Those skilled in the art can clearly understand that, to describe conveniently and concisely, for a specific working process of the system, apparatus, and unit described above, references can be made to the corresponding process in the foregoing method embodiments. Details are not described herein again.

In the embodiments provided in this disclosure, it should be understood that the disclosed apparatuses and methods may be implemented in other ways. For example, the apparatus embodiments described above are merely illustrative. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in various embodiments of this disclosure may be integrated into one processing unit, or each unit may have separate physical existence, or two or more units may be integrated in one unit.

If the function is implemented in the form of software function units and sold or used as independent products, the function may be stored in a computer readable storage medium. Based on this understanding, the essence of the technical solutions of this disclosure, or the part contributing to the prior art, or some of the technical solutions may be presented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums that can store program code, such as a USB flash disk, a removable hard disk, a read-only memory (ROM), a random access memory (RAM), a magnetic disk, or an optical disc.

In addition, it should be noted that in the apparatuses and methods of this disclosure, it is obvious that the components or the steps may be divided and/or recombined. These divisions and/or re-combinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of this disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of this disclosure.

Therefore, the objective of this disclosure may also be achieved by running a program or a set of programs on any computing apparatus. The computing apparatus may be a well-known general-purpose apparatus. Therefore, the objective of this disclosure may also be achieved by only providing a program product including program code for implementing the method or the apparatus. In other words, such a program product also constitutes this disclosure, and a storage medium storing such a program product also constitutes this disclosure. Obviously, the storage medium may be any well-known storage medium or any storage medium to be developed in the future. It should be further noted that in the apparatuses and methods of this disclosure, it is obvious that the components or the steps may be divided and/or recombined. These divisions and/or re-combinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently.

It should be noted that the division of each module is only a division of logical functions. In actual implementation, it may be integrated into one physical entity in whole or in part, or may be physically separated. And these modules may all be implemented in the form of software called by a processing component; or all of them may be implemented in the form of hardware; some modules may be implemented in the form of software called by a processing component, and some modules are implemented in the form of hardware. For example, the determination module may be a processing component provided independently, or may be integrated in one chip of the above-mentioned devices, or may be stored in the memory of the above device in the form of program code, which is called by a processing component of the above device to perform the functions of the above determination module. The implementation of other modules is similar. In addition, all or part of these modules may be integrated, or implemented independently. The processing components described herein may be an integrated circuit having a signal processing capability. In the implementation process, various steps of the above method or various above modules may be completed by an integrated logic circuit of hardware in the processor component or an instruction in a form of software.

For example, each module, unit, subunit or submodule may be one or more integrated circuits configured to implement the above method, such as one or more application specific integrated circuits (ASICs), or one or more digital signal processors (DSP), or, one or more field programmable gate arrays (FPGAs), etc. For another example, when one of the above modules is implemented in the form of program codes scheduled by a processing component, the processing component may be a general purpose processor, such as a central processing unit (CPU) or other processor capable of calling the program codes. As another example, these modules may be integrated and implemented in the form of a system-on-a-chip (SOC).

In the specification and claims of the present disclosure, the terms such as "first" and "second" are used for distinguishing similar objects, and are not necessarily used to describe a particular order or sequence. It should be understood that data used in such a way can be used interchangeably in proper situations, so that the embodiments of present disclosure described herein can be implemented in sequences other than those illustrated or depicted herein. In addition, the terms "comprise", "include" and "have" and any variation thereof are intended to cover a non-exclusive inclusion. For example, processes, methods, systems, products, or devices including a series of steps or units are not necessarily limited to these steps or units listed expressly, but instead may include other steps or units not expressly listed or inherent to these processes, methods, products, or devices. Additionally, "and/or" used in the specification and claims means at least one of the connected objects. For example, A and/or B and/or C may represent the following seven cases: only A, only B, only C, both A and B, both B and C, both A and C, and all of A, B and C exist. Similarly, expression "at least one of A or B" used in the specification and claims should be understood as: only A, only B or both A and B exist.

The optional implementations of this disclosure are described above. It should be noted that persons of ordinary skill in the art may further make several improvements and refinements without departing from the principles described in this disclosure, and these improvements and refinements also fall within the scope of this disclosure.

What is claimed is:

1. A method for transmitting time division duplex configuration indication information, performed by a terminal, comprising:

transmitting a first synchronization signal block (SSB), wherein the first SSB comprises a physical broadcast channel (PBCH), the PBCH carries time division duplex (TDD) configuration indication information, and the TDD configuration indication information comprises: TDD configuration pattern quantity indication information, periodicity indication information and uplink slot quantity indication information;

wherein the periodicity indication information indicates a periodicity of a TDD configuration pattern; when the periodicity indication information is denoted by M bits, the periodicity indication information is used for indicating $2^M$ periodicities or combination states of periodicities, where $$M \geqslant 1;$$

wherein in case that one TDD configuration pattern is configured, one code point of the periodicity indication information indicates one periodicity of the TDD configuration pattern;

and in case that two TDD configuration patterns comprising a first TDD configuration pattern and a second TDD configuration pattern are configured, one code point of the periodicity indication information indicates one combination state comprising one periodicity of the first TDD configuration pattern and one periodicity of the second TDD configuration pattern;

wherein the uplink slot quantity indication information indicates a quantity of uplink slots within one period of a TDD configuration pattern, and the uplink slot quantity indication information is denoted by N bits, where $$N \geqslant 1;$$

wherein in case that one TDD configuration pattern is configured, one code point of the uplink slot quantity indication information indicates one quantity of uplink slots of the TDD configuration pattern; in case that two TDD configuration patterns comprising a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern;

wherein when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2; both N1 and N2 are 4 bits, 5 bits, 6 bits or 7 bits;

wherein the uplink slot quantity information indicated by all code points corresponding to the N1 is a first set of inconsecutive natural numbers, the largest natural number in the first set indicates that all slots within one period of the first TDD configuration pattern are uplink slots; the uplink slot quantity information indicated by all code points corresponding to the N2 is a second set of inconsecutive natural numbers, the largest natural number in the second set indicates that all slots within one period of the second TDD configuration pattern are uplink slots.

2. The method for transmitting time division duplex configuration indication information according to claim 1, wherein the TDD configuration pattern quantity indication information is denoted by 1 bit;

and/or, wherein the TDD configuration pattern quantity indication information indicates that one TDD configuration pattern is configured for a system, or that two TDD configuration patterns are configured for the system.

3. The method for transmitting time division duplex configuration indication information according to claim 1, wherein the TDD configuration pattern refers to a slot combination configuration pattern having in one period one or more kinds of slots selected from a group comprising a downlink slot, a flexible slot, a mixed slot and an uplink slot.

4. The method for transmitting time division duplex configuration indication information according to claim 1, wherein the first SSB is a sidelink synchronization signal and PBCH block (S-SSB), and the PBCH is a physical sidelink broadcast channel (PSBCH).

5. A method for receiving time division duplex configuration indication information, performed by a terminal, comprising:

receiving a first synchronization signal block (SSB), wherein the first SSB comprises a physical broadcast channel (PBCH), the PBCH carries time division duplex (TDD) configuration indication information, and the TDD configuration indication information comprises: TDD configuration pattern quantity indication information, periodicity indication information and uplink slot quantity indication information;

wherein the periodicity indication information indicates a periodicity of a TDD configuration pattern; when the periodicity indication information is denoted by M bits, the periodicity indication information is used for indicating $2^M$ periodicities or combination states of periodicities, where $$M \geqslant 1;$$

wherein in case that one TDD configuration pattern is configured, one code point of the periodicity indication information indicates one periodicity of the TDD configuration pattern; and in case that two TDD configuration patterns comprising a first TDD configuration pattern and a second TDD configuration pattern are configured, one code point of the periodicity indication information indicates one combination state comprising one periodicity of the first TDD configuration pattern and one periodicity of the second TDD configuration pattern;

wherein the uplink slot quantity indication information indicates a quantity of uplink slots within one period of a TDD configuration pattern, and the uplink slot quantity indication information is denoted by N bits, where $$N \geq 1;$$

wherein in case that one TDD configuration pattern is configured, one code point of the uplink slot quantity indication information indicates one quantity of uplink slots of the TDD configuration pattern; in case that two TDD configuration patterns comprising a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern;

wherein when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2; both N1 and N2 are 4 bits, 5 bits, 6 bits or 7 bits;

wherein the uplink slot quantity information indicated by all code points corresponding to the N1 is a first set of inconsecutive natural numbers, the largest natural number in the first set indicates that all slots within one period of the first TDD configuration pattern are uplink slots; the uplink slot quantity information indicated by all code points corresponding to the N2 is a second set of inconsecutive natural numbers, the largest natural number in the second set indicates that all slots within one period of the second TDD configuration pattern are uplink slots.

6. The method for receiving time division duplex configuration indication information according to claim 5, wherein the TDD configuration pattern quantity indication information is denoted by 1 bit;

and/or, wherein the TDD configuration pattern quantity indication information indicates that one TDD configuration pattern is configured for a system, or that two TDD configuration patterns are configured for the system.

7. The method for receiving time division duplex configuration indication information according to claim 5, wherein the TDD configuration pattern refers to a slot combination configuration pattern having in one period one or more kinds of slots selected from a group comprising a downlink slot, a flexible slot, a mixed slot and an uplink slot.

8. The method for receiving time division duplex configuration indication information according to claim 5, wherein the first SSB is a sidelink synchronization signal and PBCH block (S-SSB), and the PBCH is a physical sidelink broadcast channel (PSBCH).

9. A terminal comprising a transceiver, a processor, and a memory storing therein a program executable by the processor, wherein the processor is configured to execute the program to implement the steps of the method according to claim 5.

10. The terminal according to claim 9, wherein the TDD configuration pattern quantity indication information indicates that one TDD configuration pattern is configured for a system, or that two TDD configuration patterns are configured for the system;

and/or, wherein the TDD configuration pattern quantity indication information is denoted by 1 bit.

11. The terminal according to claim 9, wherein the TDD configuration pattern refers to a slot combination configuration pattern having in one period one or more kinds of slots selected from a group comprising a downlink slot, a flexible slot, a mixed slot and an uplink slot.

12. The terminal according to claim 9, wherein the first SSB is a sidelink synchronization signal and PBCH block (S-SSB), and the PBCH is a physical sidelink broadcast channel (PSBCH).

13. A terminal comprising a transceiver, a processor, and a memory storing therein a program executable by the processor, wherein the processor is configured to execute the program to implement:

transmitting a first synchronization signal block (SSB), wherein the first SSB comprises a physical broadcast channel (PBCH), the PBCH carries time division duplex (TDD) configuration indication information, and the TDD configuration indication information comprises: TDD configuration pattern quantity indication information, periodicity indication information and uplink slot quantity indication information;

wherein the periodicity indication information indicates a periodicity of a TDD configuration pattern; when the periodicity indication information is denoted by M bits, the periodicity indication information is used for indicating $2^M$ periodicities or combination states of periodicities, where $$M \geq 1;$$

wherein in case that one TDD configuration pattern is configured, one code point of the periodicity indication information indicates one periodicity of the TDD configuration pattern; and in case that two TDD configuration patterns comprising a first TDD configuration pattern and a second TDD configuration pattern are configured, one code point of the periodicity indication information indicates one combination state comprising one periodicity of the first TDD configuration pattern and one periodicity of the second TDD configuration pattern;

wherein the uplink slot quantity indication information indicates a quantity of uplink slots within one period of a TDD configuration pattern, and the uplink slot quantity indication information is denoted by N bits, where $$N \geq 1;$$

wherein in case that one TDD configuration pattern is configured, one code point of the uplink slot quantity indication information indicates one quantity of uplink slots of the TDD configuration pattern; in case that two TDD configuration patterns comprising a first TDD configuration pattern and a second TDD configuration pattern are configured, one code point of the uplink slot quantity indication information indicates one quantity of uplink slots of the first TDD configuration pattern and one quantity of uplink slots of the second TDD configuration pattern;

wherein when two TDD configuration patterns are configured, N1 denotes a quantity of bits in the uplink slot quantity indication information that are used for indicating the uplink slot quantity information of the first TDD configuration pattern, N2 denotes a quantity of bits in the uplink slot quantity indication information that are used for indicating the uplink slot quantity information of the second TDD configuration pattern, and N=N1+N2; both N1 and N2 are 4 bits, 5 bits, 6 bits or 7 bits;

wherein the uplink slot quantity information indicated by all code points corresponding to the N1 is a first set of inconsecutive natural numbers, the largest natural number in the first set indicates that all slots within one period of the first TDD configuration pattern are uplink slots; the uplink slot quantity information indicated by all code points corresponding to the N2 is a second set of inconsecutive natural numbers, the largest natural number in the second set indicates that all slots within one period of the second TDD configuration pattern are uplink slots.

14. The terminal according to claim 13, wherein the TDD configuration pattern quantity indication information indicates that one TDD configuration pattern is configured for a system, or that two TDD configuration patterns are configured for the system;

and/or, wherein the TDD configuration pattern quantity indication information is denoted by 1 bit.

15. The terminal according to claim 13, wherein the TDD configuration pattern refers to a slot combination configuration pattern having in one period one or more kinds of slots selected from a group comprising a downlink slot, a flexible slot, a mixed slot and an uplink slot.

16. The terminal according to claim 13, wherein the first SSB is a sidelink synchronization signal and PBCH block (S-SSB), and the PBCH is a physical sidelink broadcast channel (PSBCH).

* * * * *